United States Patent [19]

Young et al.

[11] Patent Number: 5,095,518
[45] Date of Patent: Mar. 10, 1992

[54] INTEGRATED OPTICAL WAVEGUIDE UTILIZING ZINC OXIDE DIFFUSED INTO CONGRUENT AND MAGNESIUM OXIDE DOPED LITHIUM NIOBATE CRYSTALS

[75] Inventors: Whu-ming Young, Stanford; Martin M. Fejer, Menlo Park; Robert S. Feigelson, Saratoga; Michel J. F. Digonnet, Palo Alto, all of Calif.

[73] Assignee: The Board of Trustees of the Leland Stanford Junior University, Stanford, Calif.

[21] Appl. No.: 566,153

[22] Filed: Aug. 10, 1990

[51] Int. Cl.$^5$ .............................. G02B 6/10; G02B 6/12
[52] U.S. Cl. .................................................. 385/130
[58] Field of Search ........................... 350/96.11–96.14

[56] References Cited

U.S. PATENT DOCUMENTS

| | | | |
|---|---|---|---|
| 4,759,595 | 7/1988 | Boord et al. | 350/96.13 |
| 4,778,236 | 10/1988 | Miyawaki | 350/96.12 X |
| 4,865,407 | 9/1989 | Suzuki et al. | 350/96.12 |

OTHER PUBLICATIONS

R. V. Schmidt, et al., "Metal-Diffused Optical Waveguides in LiNbO$_3$," *Applied Physics Letters*, vol. 25, No. 8, 15 Oct. 1974, pp. 458–460.

J. M. White et al., "Optical Waveguide Refractive Index Profiles Determined From Measurement of Mode Indices: a Simple Analysis," *APPLIED OPTICS*, vol. 15, No. 1, Jan. 1976, pp. 151–155.

G. L. Tangonan, et al., "High Optical Power Optical Power Capabilities of Ti–Diffused LiTaO$_3$ Waveguide Modulator Structures," *Applied Physics Letters*, vol. 30, No. 5, 1 Mar. 1977, pp. 238–239.

G. D. Boyd, et al., "Characteristics of Metal-Diffused LiNbO$_3$ for Acoustic Devices," *Journal of Applied Physics*, vol. 48, No. 7, Jul. 1977, pp. 2880–2881.

R. L. Holman, et al., "Chemical Control of Optical Damage in Lithium Niobate," *Applied Physics Letters*, vol. 32, No. 5, 1 Mar. 1978, pp. 280–283.

A. M. Glass, "The Photorefractive Effect," *Optical Engineering*, vol. 17, No. 5, Sep.-Oct. 1978, pp. 470–479.

B. C. Grabmaier, et al., "Growth and Investigation MgO-doped LiNbO$_3$," *Journal of Crystal Growth*, vol. 79, 1986, pp. 682–688.

J. L. Jackel, et al., "Proton Exchange for High-Index Waveguides in LiNbO$_3$, " *Applied Physics Letters*, vol. 41, No. 7, 1 Oct. 1982, pp. 607–608.

Robert L. Holman, et al., "Optical Damage Resistance of Lithium Niobate Waveguides," *Optical Engineering*, vol. 21, No. 6, Nov./Dec. 1982, pp. 1025–1032.

J. Jackel, et al., "Damage-Resistant LiNbO$_3$ Waveguides," *Journal of Applied Physics*, vol. 55, No. 1, 1 Jan. 1984, pp. 269–270.

T. Findakly, et al., "Single-Mode Transmission Selective Integrated-Optical Polarisers in LiNbO$_3$," *Electronic Letters*, vol. 20, No. 3, 2nd Feb. 1984, pp. 128–129.

R. A. Becker, "'Thermal Fixing' of Ti–Diffused LiNbO$_3$ Channel Waveguides for Reduced Photorefractive Susceptibility," *Applied Physics Letters*, vol. 45, No. 2, 15 Jul. 1984, pp. 121–123.

R. Regener, et al., "Loss in Low-Finesse Ti:LiNbO$_3$ Optical Waveguide Resonators," *Applied Physics B*, vol. 36, 1985, pp. 143–147.

M. Digonnet, et al., "Characterization of Proton-Exchanged Waveguides in MgO:LiNbO$_3$," *Optics Letters*, vol. 10, No. 5, May 1985, pp. 235–237.

T. Y. Fan, et al., "Nd:MgO:LiNbO$_3$ Spectroscopy and Laser Devices," *J. Opt. Soc. Am. B*, vol. 3, No. 1, Jan. 1986, pp. 140–147.

(List continued on next page.)

Primary Examiner—Akm Ullah
Attorney, Agent, or Firm—Knobbe, Martens, Olson & Bear

[57] ABSTRACT

An integrated optical waveguide is constructed from a lithium niobate (LiNbO$_3$) crystal substrate. In preferred embodiments, a diffused layer is formed proximate to one surface of the substrate by sputtering a thin layer of a zinc-related oxide (e.g., ZnO, ZnLiNbO$_4$, or the like) onto the surface and then annealing the substrate. The resulting concentration of zinc in the diffused layer forms a waveguide having desirable optical propagation characteristics. The substrate is preferably congruent lithium niobate. In particularly preferred embodiments, the substrate is magnesium oxide (MgO) doped lithium niobate.

25 Claims, 7 Drawing Sheets

OTHER PUBLICATIONS

M. M. Fejer, et al., "Generation of 22 mW of 532-nm radiation by frequency Doubling in Ti:MgO:LiNbO$_3$ waveguides," *Optics Letters,* vol. 11, No. 4, Apr. 1986, pp. 230-232.

J. J. Veselka, et al., "Low-Insertion-Channel Waveguides in LiNbO$_3$ Fabricated By Proton Exchange," *Electronics Letters,* vol. 23, No. 6, 12th Mar. 1987, pp. 265-266.

S. Sudo et al., "MgO:LiNbO$_3$ Single-Crystal Fiber With Magnesium-Ion Indiffused Cladding," *Optics Letters,* vol. 12, No. 11, Nov. 1987, pp. 938-940.

P. G. Suchoski, et al., "Low-Loss High Extinction Polarizers Fabricated in LiNbO$_3$ by Proton Exchange," *Optics Letters,* vol. 13, No. 2, Feb. 1988, pp. 172-174.

D. W. Yoon, et al., "Characterization of Vapor Diffused Zn:LiTaO$_3$ Optical Waveguides," *Journal of Lightwave Technology,* vol. 6, No. 6, Jun. 1988, pp. 877-880.

P. G. Suchoski, et al., "Stable Low-Loss Proton-Exchanged LiNbO$_3$ Waveguide Devices with No Electro-Optic Degradation," *Optics Letters,* vol. 13, No. 11, Nov. 1988, pp. 1050-1052.

E. Glavas, et al., "A Comparison of Optical Damage in Different Types of LiNbO$_3$ Waveguides," *J. Phys. D: Appl. Phys.,* vol. 22, 1989, pp. 611-616.

F. J. Leonberger, et al., "LiNbO$_3$ and LiTaO$_3$ Integrated Optic Components for Fiber Optic Sensors," *Proceedings of the 6th International Conference, OFS '89, Paris, France,* Sep. 18-20, 1989, pp. 5-9.

T. R. Volk, et al., "Optical-Damage-Resistant LiNbO$_3$:Zn Crystal," *Optics Letters,* vol. 15, No. 18, Sep. 15, 1990, pp. 996-998.

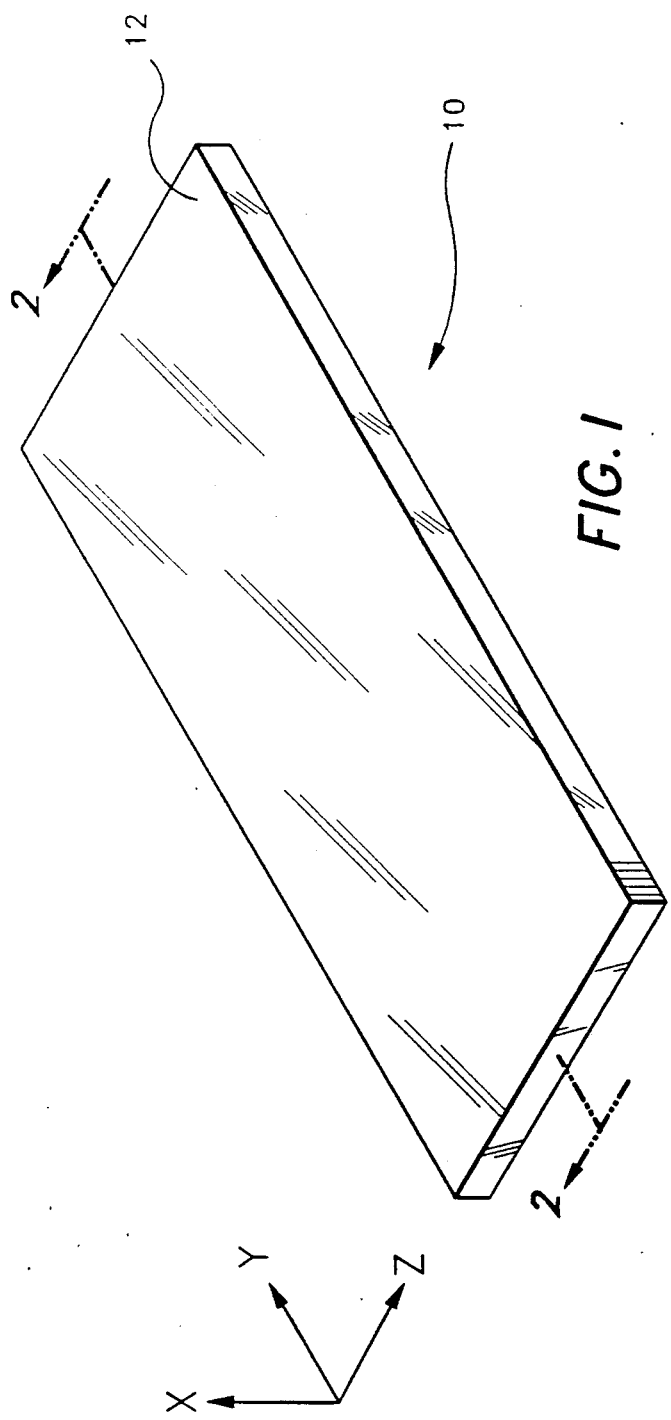
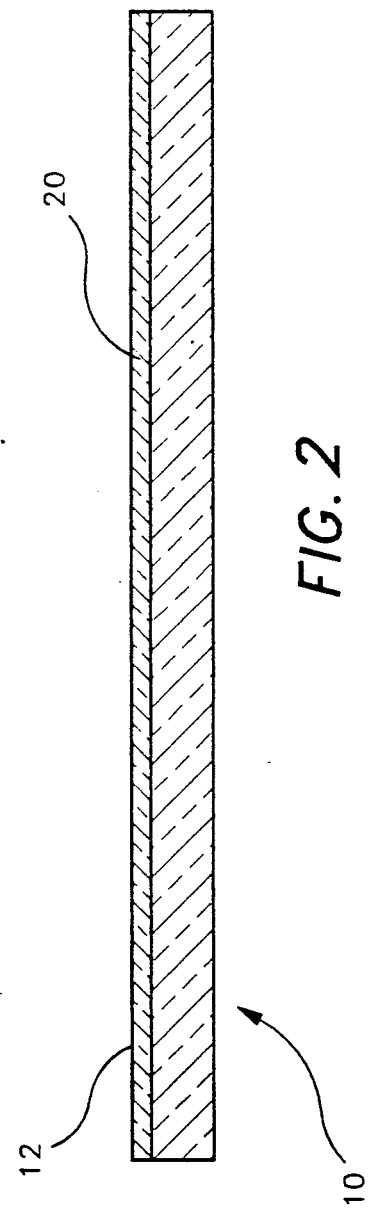

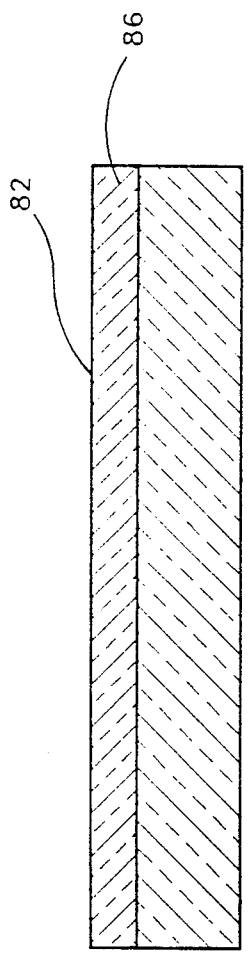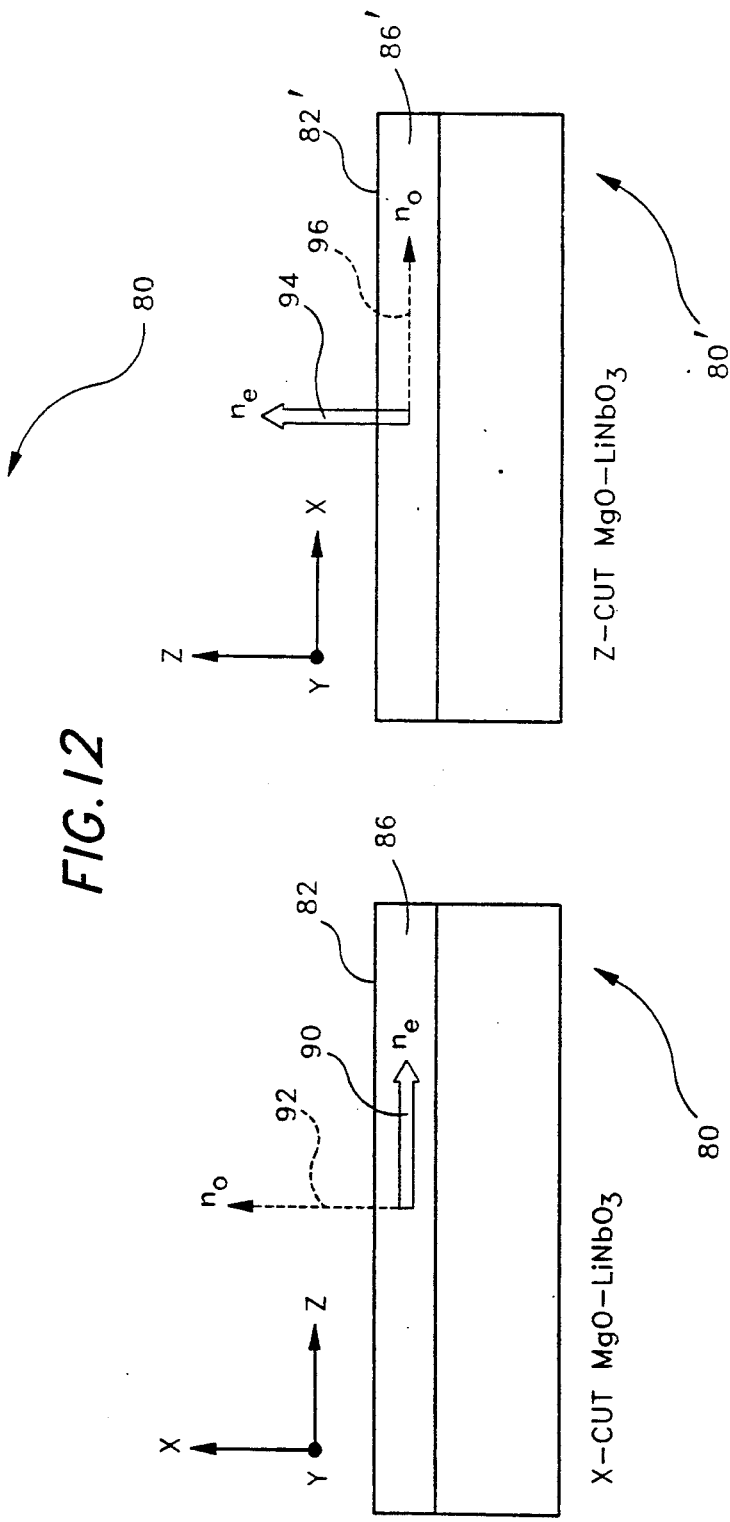

INTEGRATED OPTICAL WAVEGUIDE UTILIZING ZINC OXIDE DIFFUSED INTO CONGRUENT AND MAGNESIUM OXIDE DOPED LITHIUM NIOBATE CRYSTALS

BACKGROUND OF THE INVENTION

1. Field of the Invention

The present invention is in the field of integrated optics, and, in particular, is in the field of integrated optical wavelengths formed by diffusing a material into a substrate to change the refractive index of a portion of the substrate to form the waveguide.

2. Description of the Related Art

Integrated optical waveguides are well-known in the art. Such waveguides are formed, for example, by diffusing a dopant material into a substrate such that a portion of the substrate comprises a diffused layer that has different light propagation characteristics than the original substrate. By controlling the depth and concentration of the diffused layer, a waveguide having desired optical propagation characteristics can be obtained. Prior integrated optical waveguides have been formed by diffusing titanium (Ti) into electro-optic materials such as lithium niobate ($LiNbO_3$) and $LiTaO_3$, as illustrated, for example, in G. L. Tangonan, et al., "High optical power capabilities of Ti-diffused $LiTaO_3$ waveguide modulator structures," *Applied Physics Letters.* Vol. 30, No. 5, Mar. 1, 1977, pp. 238-239. Integrated optical waveguides have also been formed by vapor diffusion of zinc (Zn) into $LiTaO_3$, as illustrated, for example, in D. W. Yoon, et al., "Characterization of Vapor Diffused $Zn:LiTaO_3$ Optical Waveguides," *JOURNAL OF LIGHTWAVE TECHNOLOGY,* Vol. 6, No. 6, June 1988, pp. 877-880. Other integrated optical waveguides have been formed by proton exchange, as illustrated, for example, in P. G. Suchoski, et al., "Stable low-loss proton-exchanged $LiNbO_3$ waveguide devices with no electro-optic degradation," *OPTICS LETTERS,* Vol. 13, No. 11, November 1988, pp. 1050-1052; J. J. Veselka, et al., "LOW-INSERTION-LOSS CHANNEL WAVEGUIDES IN $LiNbO_3$ FABRICATED BY PROTON EXCHANGE," *ELECTRONICS LETTERS,* Vol. 23, No. 6, Mar. 12, 1987, pp. 265-266; and J. Jackel, et al., "Damage-resistant $LiNbO_3$ waveguides," *Journal of Applied Physics,* Vol. 55, No. 1, Jan. 1, 1984, pp. 269-270. There have also been combinations of the diffusion and proton exchange techniques integrated optical components in order to obtain characteristics from both processes, as illustrated for example, in F. J. Leonberger, et al., "$LiNbO_3$ and $LiTaO_3$ Integrated Optic Components for Fiber Optic Sensors," *Optical Fiber Sensors, Proceedings of the 6th International Conference, OFS'89,* Paris, France, Sept. 18-20, 1989, pp. 5-9; P. G. Suchoski, et al., "Low-loss high-extinction polarizers fabricated in $LiNbO_3$ by proton exchange," *OPTICS LETTERS,* Vol. 13, No. 2, February 1988, pp. 172-174; and T. Findakly, et al., "SINGLE-MODE TRANSMISSION SELECTIVE INTEGRATED-OPTICAL POLARISERS IN $LiNbO_3$," *ELECTRONICS LETTERS,* Vol. 20, No. 3, Feb. 2, 1984, pp. 128-129.

As discussed in the above-cited references, the different processes result in different characteristics for the waveguides manufactured in accordance with the processes. For example, titanium-diffused waveguides have adequate performance for some applications, such as propagating light in the infrared portion of the spectrum, but are notoriously inadequate for operation in the visible portion of the spectrum because of high photorefractive sensitivity which causes scattering. Waveguides formed using proton exchange techniques provide better performance in the visible portions of the spectrum. However, the proton exchange process is a relatively low-temperature process (an exchanging temperature of approximately 200° C.-250° C.) compared to the titanium-diffusion process (an annealing temperature of approximately 900° C.-1100° C.). It is believed that the higher temperature process results in a more stable waveguide since the operating temperature of the waveguide will be much further away from an annealing temperature at which the waveguide was formed. In addition, a zinc waveguide will guide both polarizations instead of only one polarization as in a waveguide formed using a proton exchange process.

As set forth above, zinc has been used as a diffusion material on $LiTaO_3$ substrates with some success. However, when attempts were made to diffuse zinc on lithium niobate, severe pitting and surface damage were observed on the substrates. Thus, zinc has been considered to be an unsuitable diffusion material for lithium niobate.

There has existed a need for a material that can be used in combination with a lithium niobate substrate to provide an optical waveguide that can be used with visible light, is manufactured with a high temperature process, and which has suitable optical propagation characteristics such as guiding both polarizations.

SUMMARY OF THE INVENTION

The present invention comprises an integrated-optical waveguide that is constructed using a lithium niobate substrate having a surface onto which a layer of zinc oxide (ZnO) is deposited. The substrate can be either lithium niobate or magnesium oxide (MgO) doped lithium niobate. The substrate is maintained at a selected high temperature for a selected time so that the zinc oxide layer diffuses into the lithium niobate to form a diffused layer proximate to the surface of the lithium niobate substrate. The diffused layer thus formed provides an optical waveguide having desirable optical propagation characteristics. Unlike the prior processes in which zinc was diffused into a lithium niobate substrate, the waveguide constructed using zinc oxide in accordance with the present invention does not exhibit the surface damage and has suitable optical propagation characteristics.

BRIEF DESCRIPTION OF THE DRAWINGS

FIG. 1 is a perspective view of a lithium niobate ($LiNbO_3$) substrate in accordance with the present invention.

FIG. 2 is a cross-sectional view of the lithium niobate substrate taken along the lines 2—2 in FIG. 1, showing the layer of zinc oxide applied to the upper surface of the lithium niobate substrate.

FIG. 12 is a cross-sectional view of the magnesium oxide doped lithium niobate substrate after annealing in the furnace showing the diffused layer proximate to the upper surface of the magnesium oxide doped lithium niobate substrate.

FIG. 13 is a pictorial cross-sectional view of the X-cut magnesium oxide doped lithium niobate substrate illustrating the increased extraordinary refractive index along the Z-axis parallel to the upper surface and the increased ordinary refractive index along the X-axis perpendicular to the upper surface, in both cases for Y-propagating signals.

FIG. 14 is a pictorial cross-sectional view of a Z-cut magnesium oxide doped lithium niobate substrate showing the increased extraordinary refractive index along the Z-axis perpendicular to the upper surface and the increased ordinary refractive index along the X-axis parallel to the upper surface, in both cases for Y-propagating signals.

DETAILED DESCRIPTION OF THE PREFERRED EMBODIMENTS

Figure 3:
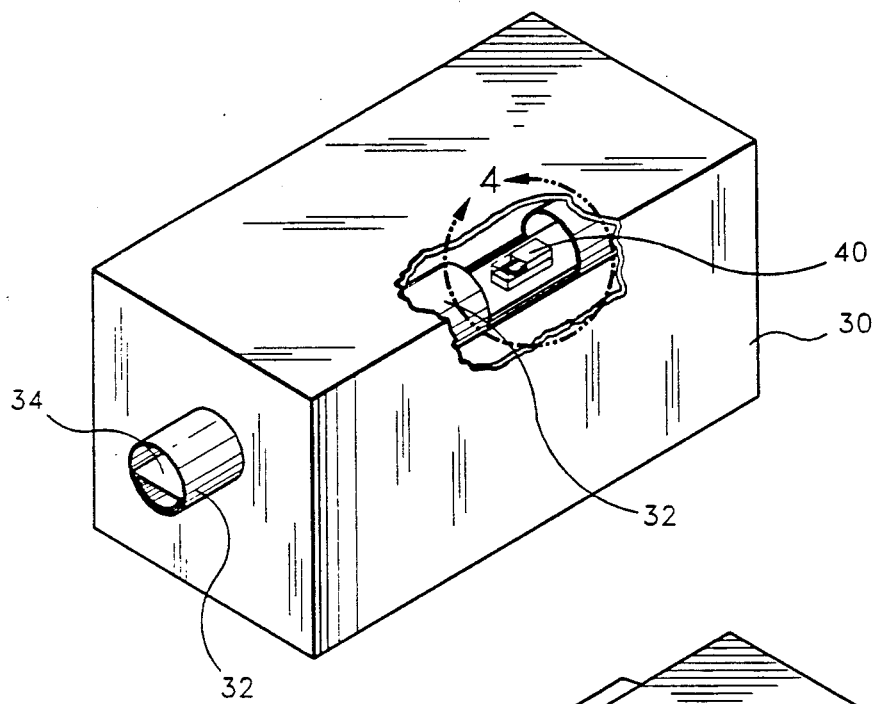
FIG. 3 is a perspective view of a furnace for annealing the lithium niobate substrate with a partially broken portion showing the placement of a boat in which the lithium niobate substrate is contained within the furnace.

FIG. 1 illustrates an exemplary substrate 100 comprising lithium niobate ($LiNbO_3$) crystal or other suitable material. The substrate 10 is formed as a thin slab that has an upper surface 12. It has been found that is preferable to utilize either congruent lithium niobate or magnesium oxide doped lithium niobate ($MgO—LiNbO_3$) as the substrate 10. Both congruent lithium niobate and magnesium doped lithium niobate are commercially available products that have excellent light propagation characteristics. One skilled in the art will appreciate that congruent lithium niobate is formed by a crystal growth process in which the resulting crystal has a non-stoichiometric lithium to niobium ratio (e.g., approximately 48.6% lithium versus 51.4% niobium). Other ratios can also be used.

The magnesium doped lithium niobate is formed by doping a lithium niobate crystal with magnesium oxide (MgO) to add impurities to the crystal which do not change the crystal structure but which improve certain light propagation characteristics of the crystal. For example, it has been shown that when the optical power applied to a lithium niobate crystal, from a laser light source for example, is substantially increased, a photorefractive effect occurs which causes light to be scattered within the crystal such that light output from the crystal does not form a well-defined spot. On the other hand, when the same light is applied to a magnesium oxide doped lithium niobate crystal, the light output from the crystal remains well-defined even at much greater optical power. In the embodiment described in connection with FIG. 1, a lithium niobate crystal is used for the substrate 10.

As is known in the art, crystals such as lithium niobate crystals have different axes which exhibit different characteristics depending upon which direction light is propagating with respect to the axes. The axes are referred to as the X-axis, the Y-axis and the Z-axis. A crystal can be cut along the plane to form a desired crystal surface. For example, when a surface is formed by cutting the crystal in the X-Y plane, the surface thus formed is perpendicular to the Z-axis and the crystal is referred to as a Z-cut crystal. Similarly, when the crystal is cut to form a surface in the Y-Z plane that is perpendicular to the X-axis, the crystal is referred to as an X-cut crystal. In the embodiment of FIG. 1, the lithium niobate crystal 10 is Z-cut such that the upper surface 12 is in the X-Y plane and is perpendicular to the Z-axis, as indicated by the directional arrows proximate to the substrate 10. Although described herein with respect to X-cut and Z-cut crystals, it should be understood that similar effects can be obtained by using Y-cut crystals or crystals that are not cut along one of the principal planes.

FIG. 2 illustrates a cross-sectional portion of the substrate 10 of FIG. 1 showing the addition of a layer 20 of zinc oxide (ZnO) applied to the upper surface 12. The thickness of the ZnO layer 20 can be varied; however, a particularly advantageous thickness for the ZnO layer 20 has been found to be approximately 1000Å. The ZnO layer 20 is applied to the upper surface 12 by sputtering which is a well-known method for applying materials to surfaces. The duration of the sputtering process is controlled to control the thickness of the ZnO layer 20. Although described herein with respect to ZnO, it should be understood that other Zn-related oxides, such as $ZnLiNbO_4$ should also provide the effect described herein.

Figure 4:
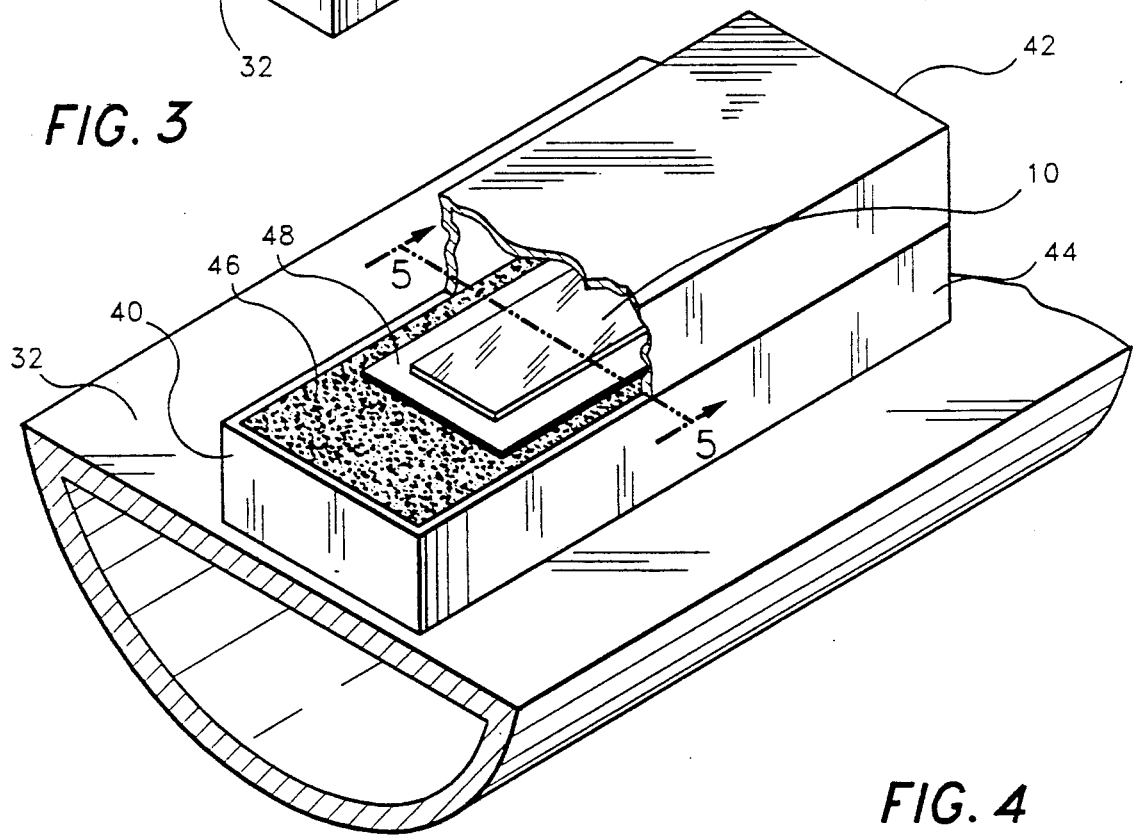
FIG. 4 is an enlarged perspective view of the portion 4 of FIG. 3 showing the boat in more detail with a portion of the boat broken open to show the placement of the lithium niobate substrate on platinum foil on a bed of lithium niobate powder.

After applying the ZnO layer 20, the substrate 10 is placed in conventional high-temperature furnace 30, as illustrated in FIG. 3. For example, the furnace 30 may include a ceramic tube 32 which extends through the furnace 30 and which supports a ceramic D-tube 34 which slides into the tube 32. In the preferred embodiments of the present invention, the lithium niobate substrate 10 is placed in a ceramic boat 40, shown more clearly in FIG. 4, which has a top half 42 and a bottom half 44. The bottom half 44 is filled with lithium niobate powder 46. A thin sheet 48 of a non-reactive material is placed on the top surface of the lithium niobate powder 46 and the substrate 10 is placed on top of the sheet 48.

The sheet 48 supports the substrate 10 and isolates the substrate 10 from direct contact with the powder 46. In the preferred embodiment described herein, the sheet 48 comprises platinum foil; however, other non-reactive materials can also be used. Alteratively, the substrate 10 can be positioned directly on the surface of the lithium niobate powder 46 without requiring the sheet of platinum foil.

After placing the substrate 10 on the sheet 48, the top half 42 of the ceramic boat 40 is placed on the bottom half 44 to enclose the substrate 10. The boat 40 is placed on the D-tube 34 which is then slid into the ceramic tube 32 so that the boat 40 and thus the substrate 10 and powder 46 are exposed to the heat within the furnace 30.

Figure 5:
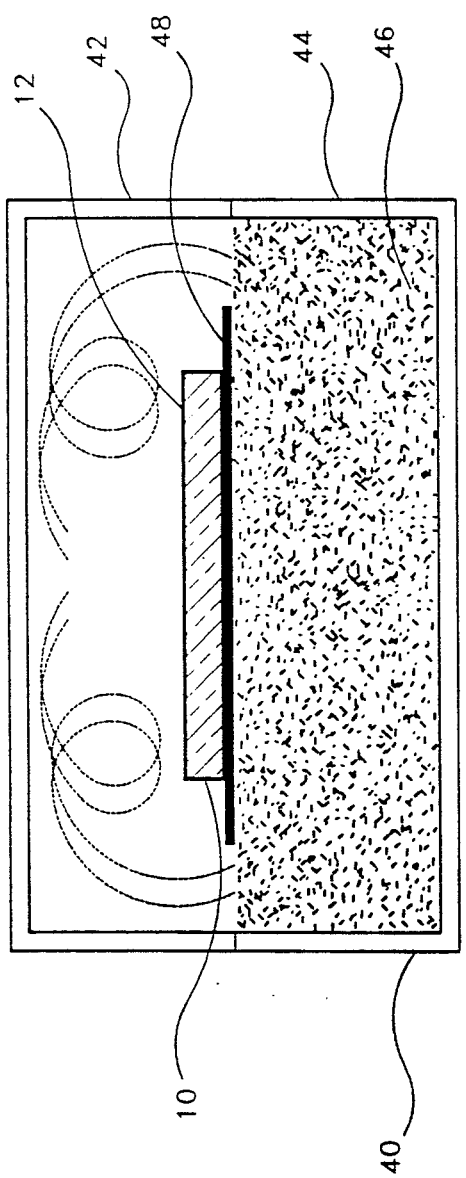
FIG. 5 is a cross-sectional view taken along the lines 5—5 in FIG. 4 showing the position of the lithium niobate substrate in the boat and pictorially illustrating an atmosphere of $Li_2O$ over the upper surface of the lithium niobate substrate.
Figure 6:
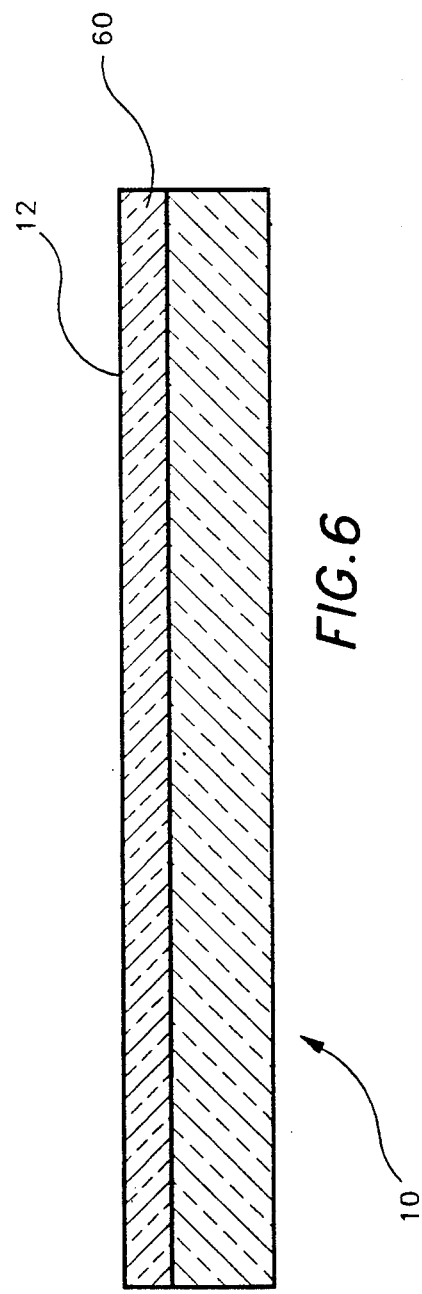
FIG. 6 is a cross-sectional view of the lithium niobate substrate after annealing in the furnace showing the diffused layer proximate to the upper surface of the lithium niobate substrate.

As shown in the cross-sectional view in FIG. 5, the heat of the furnace 30 causes an atmosphere of $Li_2O$ to be formed within the boat 40 so that the upper surface 12 of the substrate 10 is exposed to that atmosphere as it is being heated. The $Li_2O$ vapor pressure of the atmosphere is close to or slightly above the $Li_2O$ vapor pressure of the substrate so as to suppress lithium outdiffusion from the substrate. The substrate 10 is annealed for a predetermined time at a predetermined temperature to cause the ZnO on the upper surface 12 to diffuse into the substrate 10 proximate to the upper surface 12 to form a diffused layer 60, as illustrated in the cross-sectional view in FIG. 6. The diffused layer 60 comprises the lithium niobate crystal structure with impurities of zinc. (Although the layer 20 comprises ZnO, it is likely that the dopants are in the form of zinc ions rather than ZnO). However, unlike the prior attempts to diffuse zinc directly which resulted in an unsatisfactory diffused layer, the use of ZnO in the present invention results in a diffused layer 60 having suitable light propagation characteristics so that the diffused layer 60 can be used as a waveguide. Reference will be made hereinafter to the concentration of zinc in the diffused layer 60 although the source of the zinc is the ZnO layer 20. Again, other Zn-related oxides should also provide the effect described herein.

The concentration of the diffused zinc in the substrate 10 depends upon at least three factors: the thickness of the ZnO layer on the upper surface 12, the annealing temperature, and the annealing time. When the appropriate combination of factors is utilized, the diffused layer 60 is clear and free from pitting and cracking such that the diffused layer 60 provides an optical propagation path with little scattering of light propagating therein. It has been discovered through experimentation that an annealing temperature in the range of 950° C.–1050° C. is suitable for the lithium niobate substrate 10. This temperature range provides the best results; however, other annealing temperatures can also be used. In particularly preferred embodiments, an annealing temperature of 1000° C. is used.

Similarly, it has been discovered that a ZnO thickness of approximately 1000Å for the layer 20 provides satisfactory results for the diffused layer 60. If the thickness of the layer 20 is increased substantially above 1000Å, the diffused layer 60 tends to become translucent and therefore does not have satisfactory light propagation characteristics. If the thickness of the layer 20 is substantially less than 1000Å, the diffused layer 60 may not be sufficiently thick, or, if the diffusion is allowed to continue, then the concentration of the zinc in the diffused layer 60 may not be sufficient to effect a significant change in the refractive index.

Figure 7:
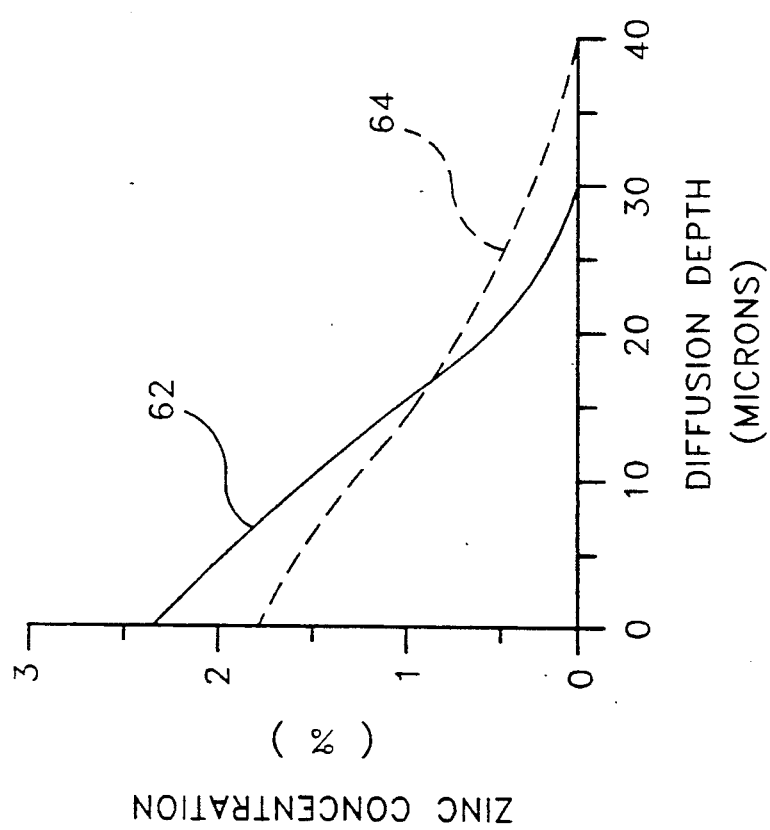
FIG. 7 is a graph illustrating the concentration of zinc in the lithium niobate substrate versus the depth relative to the upper surface of the lithium niobate substrate.

The annealing time can be varied to control the depth of the diffused layer 60 and thus the concentration of the zinc in the diffused layer 60. This is illustrated in FIG. 7 for a annealing temperature of 1000° C. and an annealing time of 4 hours. FIG. 7 is a graph of zinc concentration in molar percentage versus the depth of the diffused layer with respect to the upper surface 12. As illustrated by a concentration curve 62 (solid line), at the upper surface 12 (i.e., a depth of 0 microns), the concentration of the zinc is approximately 2.3%. At a depth of 10 microns, the concentration of the zinc is approximately 1.4%. At a depth of 20 microns, the concentration of the zinc is approximately 0.6%. At a depth of 30 microns, the concentration of the zinc is substantially 0%. If the annealing time is increased, the concentration curve 62 will shift to the right and downward as illustrated by a concentration curve 64 (dashed line). This will have the effect of increasing the overall depth of the diffused layer 60 but the maximum concentration will be lower. It is believed that a zinc concentration on the order of 0.1%–0.5%, or greater, provides an adequate increase in the refractive index. Similarly, the depth of the diffused layer 60 can be decreased by decreasing the annealing time; however, the annealing time should be sufficient so that all the ZnO is diffused into the substrate 10. In one preferred embodiment of the present invention, the annealing time is adjusted to provide a diffused layer 60 which provides a guiding structure having an index profile that has a 1/e depth of approximately 2–7 microns to provide single mode propagation of light. (The 1/e depth is the depth where the concentration is 1/e times the maximum concentration.)

Although described above in connection with the atmosphere having a $Li_2O$ vapor pressure close to or slightly above the vapor pressure of $Li_2O$ in the substrate, the foregoing process can also be performed using a dry oxygen atmosphere or a wet oxygen atmosphere in the furnace 30. In either of these two cases, the boat 40 is not required and the substrate 10 can be placed directly on the D-tube 34 on a piece of ceramic (not shown) or the like. The preferred method, however, is to use the $Li_2O$ atmosphere in the boat 40, as described above.

Figure 9:
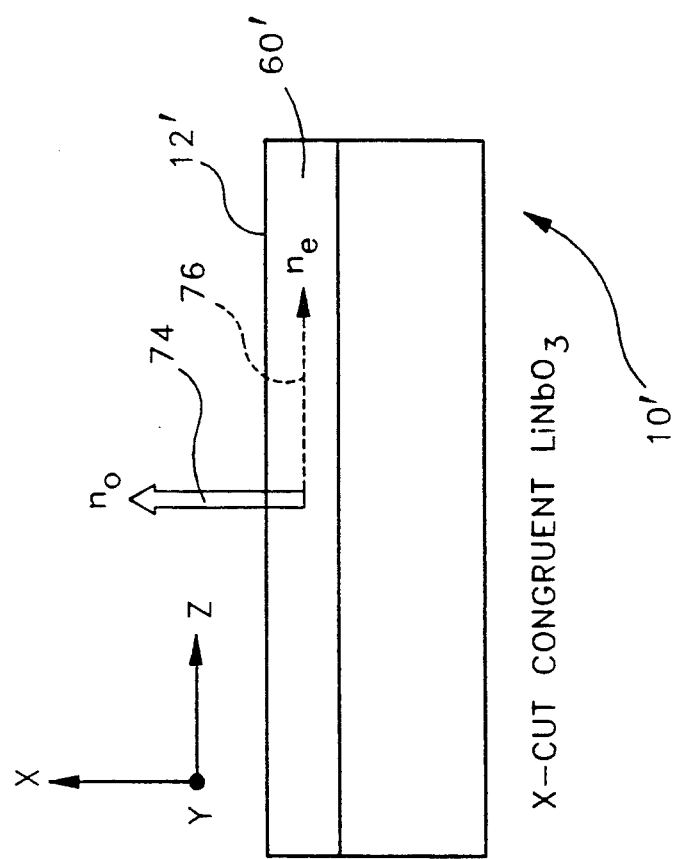
FIG. 9 is a pictorial cross-sectional view of an X-cut lithium niobate substrate illustrating the increased ordinary refractive index along the X-axis perpendicular to the upper surface and the increased extraordinary refractive index along the Z-axis parallel to the upper surface, in both cases for Y-propagating signals.
Figure 8:
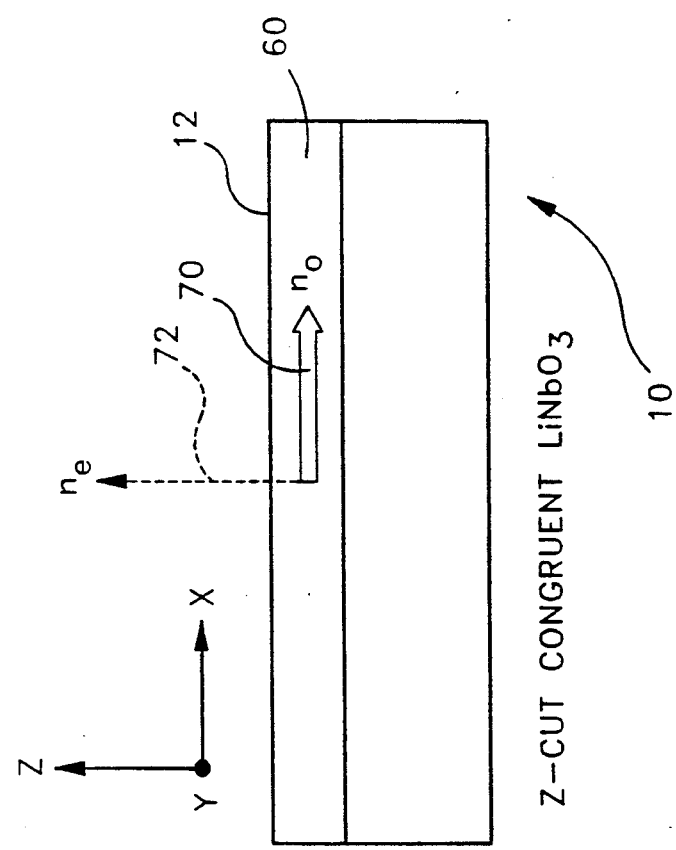
FIG. 8 is a pictorial cross-sectional view of the Z-cut lithium niobate substrate illustrating the increased ordinary refractive index along the X-axis parallel to the upper surface and the increased extraordinary refractive index along the Z-axis perpendicular to the upper surface, in both cases for Y-propagating signals.

The diffused layer 60 forms an optical waveguide having increased refractive indices. Referring to FIGS. 8 and 9, the optical propagation characteristics of the diffused layer 60 depend upon the crystal orientation of the substrate 10. As illustrated in FIG. 8, the diffused layer 60 of the lithium niobate embodiment is in the X-Y plane of the substrate 10 and is thus perpendicular to the Z-axis. As is well known in the art, a lithium niobate crystal is birefrigent. That is, it has two refractive indexes, an ordinary refractive index $n_o$ associated with the X-axis and the Y-axis, and an extraordinary refractive index $n_e$ associated with the Z-axis. The refractive index seen by an optical signal propagating in the crystal depends upon the orientation of the electrical field of the optical signal with respect to the axes of the crystal. When light is propagating along the Z-axis of the crystal, the electrical field is perpendicular to the Z-axis and thus is in the X-Y plane with components along either the X-axis, the Y-axis, or both the X-axis and the Y-axis. In any case, light propagating along the Z-axis sees the ordinary refractive index $n_o$. When light is propagating along the Y-axis, the electrical field is in the Y-Z plane and may have components along the X-axis, the Z-axis or both. As illustrated by a double arrow 64 in FIG. 8, if the electrical field is along the X-axis, the light will see the ordinary refractive index $n_o$, as before. If the electrical field is along the Z-axis, the light will see the extraordinary refractive index $n_e$, as illustrated by the a dashed arrow 72. In the present invention, the ordinary refractive index is increased. Under some conditions, the extraordinary refractive index also increases, but, in general, the behavior of the extraordinary refractive index in the diffused layer 60 is process dependent. For example, the refractive index may decrease in some conditions, whereas in other conditions, the refractive index may increase at some depths and decrease at other depths within the same substrate.

A similar effect will be observed for an X-cut lithium niobate crystal having the ZnO coating applied to an upper surface perpendicular to the X-axis, as illustrated in FIG. 9 for a substrate 10' having an upper surface 12' and a diffused layer 60'. The ordinary and extraordinary refractive indices change as described above. That is, the ordinary refractive index increases, and the extraordinary refractive index increases under some conditions. Again, the behavior of the extraordinary refractive index is generally complicated. A light signal propagating in the direction of the Y-axis of the diffused layer 60' will see the increased ordinary refractive $n_o$ (as illustrated by a double arrow 74 in FIG. 9) if the electrical field is oriented in the direction of the X-axis. A light signal propagating in the direction of the Y-axis will see the changed extraordinary refractive index $n_e$ if the electrical field is oriented in the direction of the Z-axis (as illustrated by a dashed arrow 76 in FIG. 9).

Figure 10:
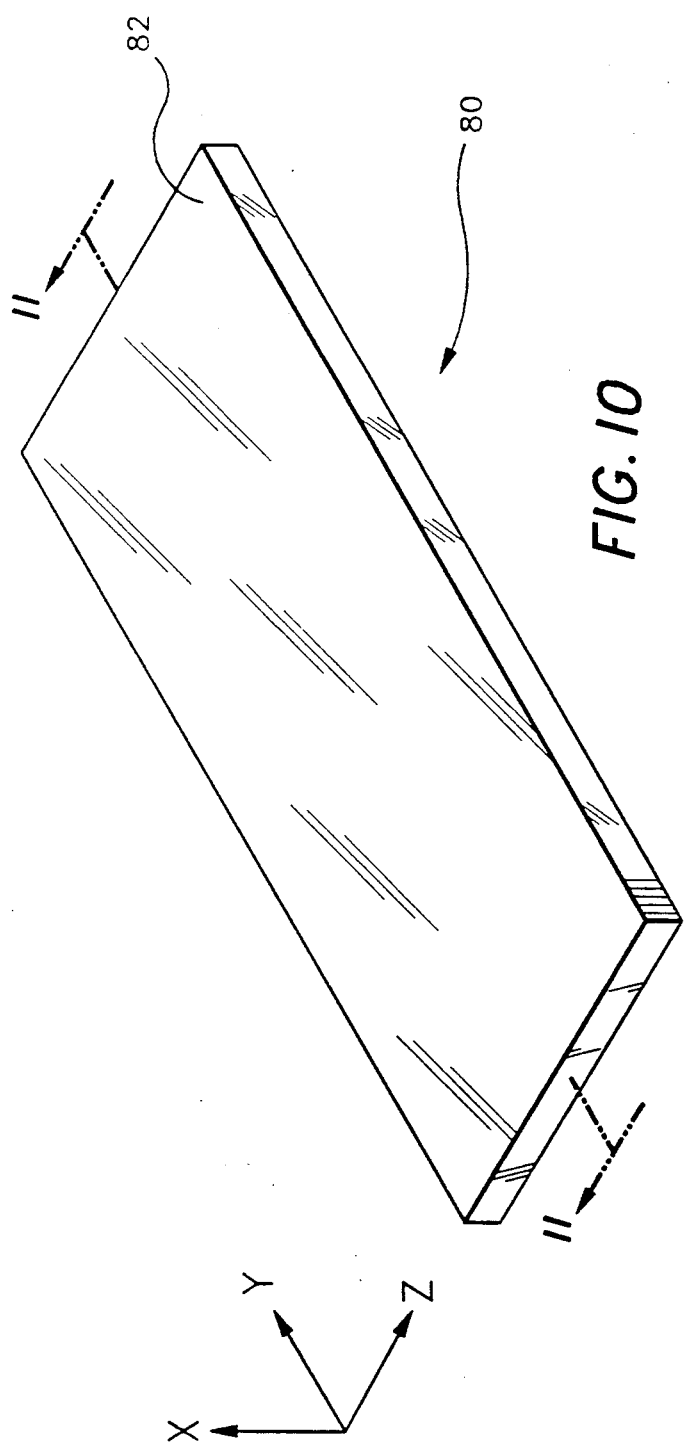
FIG. 10 is a perspective view of a magnesium oxide (MgO) doped lithium niobate ($MgO—LiNbO_3$) substrate in accordance with the present invention.
Figure 11:
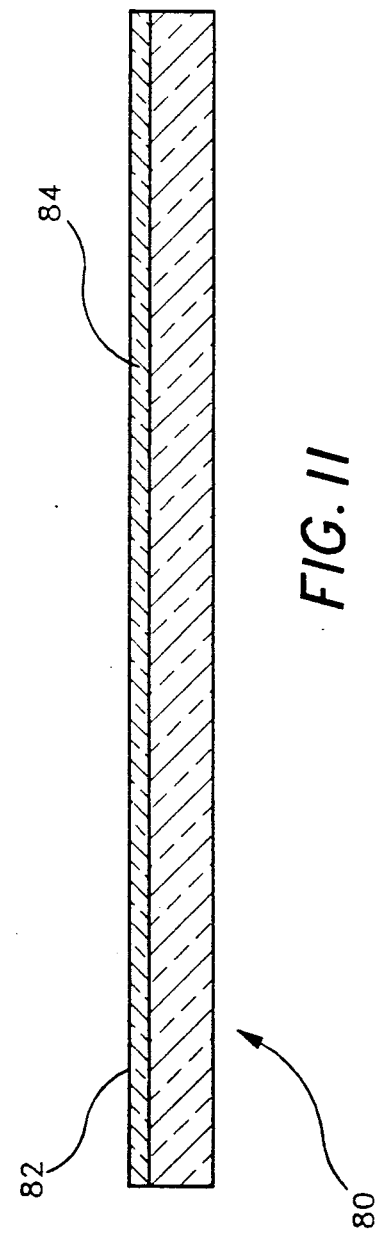
FIG. 11 is a cross-sectional view of the magnesium oxide doped lithium niobate substrate taken along the lines 11—11 in FIG. 10, showing the layer of zinc oxide applied to the upper surface of the magnesium oxide doped lithium niobate substrate.

FIGS. 10 and 11 correspond to FIGS. 1 and 2 for an X-cut magnesium oxide doped lithium niobate substrate 80. The magnesium doped lithium niobate substrate 80 has an upper surface 82 that is perpendicular to the X-axis of the substrate 80. A layer 84 of ZnO is applied to the surface and annealed in the furnace 30 as described above in connection with FIGS. 3-5 to form a diffused layer 86 shown in FIG. 12. Unlike the previously described lithium niobate embodiment, in the magnesium oxide doped lithium niobate embodiment, the ZnO layer 84 is applied to a thickness of approximately 1600Å, or less, and the furnace temperature is preferably adjusted to be approximately 1100° C. It has been found that the best results are obtained when the annealing temperature is in the range of 950° C.–1100° C.; however, other temperatures will also be suitable.

The magnesium oxide doped lithium niobate substrate 80 has different optical propagation characteristics than the lithium niobate substrate 10 described above. The above described process increases the ordinary refractive index $n_o$ and the extraordinary refractive index $n_e$ of the magnesium oxide doped lithium niobate substrate 80. Thus, as illustrated in FIG. 13, light propagating in the direction of the Y-axis in the diffused layer 86 having the electrical field of the light oriented in the direction of the Z-axis sees the increased extraordinary refractive index $n_e$ (as illustrated by the double arrow 90 in FIG. 13). When the electrical field of the light is oriented in the direction of the X-axis, the light propagating in the direction of the Z-axis sees the ordinary refractive index $n_o$ (as illustrated by a dashed arrow 92 in FIG. 13).

Similar results will occur when a Z-cut magnesium doped lithium niobate substrate 80' having an upper surface 82' and a diffused layer 86' is formed in accordance with the present invention as illustrated in FIG. 14. Again, the ordinary refractive index $n_o$ and the extraordinary refractive index $n_e$ are increased. Thus, light propagating in the direction of the Y-axis having the electrical field oriented in the direction of the Z-axis sees the increased extraordinary refractive index $n_e$ (as illustrated by a double arrow 94 in FIG. 14). Light propagating in the direction of the Y-axis with the electrical field oriented in the direction of the X-axis sees the increased ordinary refractive index $n_o$ (as illustrated by the dashed arrow 96 in FIG. 14).

The waveguides formed in accordance with the present invention are believed to be more stable than ones formed using the proton exchange method, for example, since the waveguides of the present invention are formed at temperatures that are substantially higher than the expected operating temperatures of the waveguides and they guide both polarizations. In addition, the waveguides of the present invention do not exhibit the pitting and surface damage observed on previous devices that utilized zinc as the diffusion material.

Various embodiments of the present invention have been described above. Although the invention has been described with reference to these specific embodiments, the descriptions are intended to be illustrative of the invention and are not intended to be limiting. Various modifications and applications may occur to those skilled in the art without departing from the true spirit and scope of the invention as defined in the appended claims.

What is claimed is:

1. An optical waveguide, comprising:
   a substrate comprised of a lithium niobate material, said substrate having a diffused layer formed by diffusion of a material comprising a compound including zinc and oxygen into a surface of said substrate, said material having a thickness before diffusion selected so that substantially all of said material diffuses into said substrate such that said surface of said substrate remains substantially free of surface defects.

2. The optical waveguide of claim 1, wherein said lithium niobate material comprises congruent lithium niobate.

3. The optical waveguide of claim 1, wherein said compound including zinc and oxygen comprises zinc oxide.

4. The optical waveguide of claim 1, wherein said diffused layer is sized to provide a guiding structure having a dimension of about 2-7 microns.

5. The optical waveguide of claim 1, wherein said lithium niobate material comprises lithium niobate doped with magnesium oxide.

6. The optical waveguide of claim 1, wherein the lithium niobate material comprises an X-cut crystal.

7. The optical waveguide of claim 1, wherein the lithium niobate material comprises an Y-cut crystal.

8. The optical waveguide of claim 1, wherein the lithium niobate material comprises an Z-cut crystal.

9. A method of manufacturing an optical waveguide, comprising:
   forming a diffused layer on a surface of a substrate comprised of a lithium niobate material by diffusing a material comprising a compound including zinc and oxygen into said substrate, said layer having a thickness before diffusion selected so that substantially all of said material diffuses into said substrate such that said surface of said substrate remains substantially free of surface defects.

10. The method of claim 9, wherein the step of forming the diffused layer comprises the steps of applying a layer of zinc oxide on a surface of said substrate and applying heat to cause diffusion.

11. The method of claim 10, wherein said layer of zinc oxide has a thickness on the order of about 1000 angstroms, and said lithium niobate material comprises congruent lithium niobate.

12. The method of claim 10, wherein said step of applying heat comprises the step of heating said layer of zinc oxide to a temperature in the range of approximately 950° C. to 1100° C.

13. The method of claim 12, wherein said lithium niobate material comprises congruent lithium niobate and said step of applying heat comprises heating said layer of zinc oxide to approximately 1000° C.

14. The method of claim 12, wherein said lithium niobate material comprises lithium niobate doped with magnesium oxide and said step of applying heat comprises heating said layer of zinc oxide to approximately 1100° C.

15. The method of claim 10, wherein said layer of zinc oxide has a thickness on the order of about 1600 angstroms or less and said lithium niobate material comprises lithium niobate doped with magnesium oxide.

16. A method of manufacturing an optical waveguide, comprising:
forming a diffused layer on a surface of a substrate comprised of a lithium niobate material by diffusing a material comprising a compound including zinc and oxygen into said substrate, said layer having a thickness before diffusion selected so that substantially all of said material diffuses into said substrate such that said surface of said substrate remains substantially free of surface defects, wherein the step of forming the diffused layer comprises the steps of applying a layer of zinc oxide on a surface of said substrate and applying heat to cause diffusion, and wherein the step of applying heat comprises controlling the duration of heating such that said diffused layer has a depth which provides a guiding structure for single mode propagation of light.

17. A method of manufacturing an optical waveguide, comprising:
forming a diffused layer on a surface of a substrate comprised of a lithium niobate material by diffusing a material comprising a compound including zinc and oxygen into said substrate, said layer having a thickness before diffusion selected so that substantially all of said material diffuses into said substrate such that said surface of said substrate remains substantially free of surface defects, wherein the step of forming the diffused layer comprises the steps of applying a layer of zinc oxide on a surface of said substrate and applying heat to cause diffusion, and wherein the step of applying heat comprises heating said layer of zinc oxide in an atmosphere having a vapor pressure of $Li_2O$ sufficiently close to the vapor pressure of $Li_2O$ of said substrate to suppress out diffusion of lithium from said substrate.

18. The method of claim 17, wherein said vapor pressure of $Li_2O$ of said atmosphere is equal to or slightly greater than the vapor pressure of $Li_2O$ of said substrate.

19. A method of manufacturing an optical waveguide, comprising:
diffusing a first compound material into a surface of a substrate formed of a second material, said first compound material comprising at least two elements, one of said elements being zinc, said first compound material having a thickness before diffusion selected so that substantially all of said material diffuses into said substrate such that said surface of said substrate remains substantially free of surface defects.

20. The method as defined in claim 19, wherein said first compound material comprises zinc oxide.

21. An optical waveguide produced by a process comprising:
applying heat to a layer comprising compound including zinc and oxygen disposed on a surface of a substrate comprising a lithium niobate material, said layer having a thickness before applying said heat selected so that substantially all of said material diffuses into said substrate such that said surface of said substrate remains substantially free of surface defects.

22. The optical waveguide of claim 21, wherein the layer is heated to a temperature in the range of approximately 950° C. to 1100° C.

23. The optical waveguide of claim 22, wherein the substrate comprises congruent lithium niobate and the layer is heated to approximately 1000° C.

24. The optical waveguide of claim 22, wherein the substrate comprises lithium niobate doped with magnesium oxide and the layer is heated to approximately 1100° C.

25. The optical waveguide of claim 21, wherein said compound including zinc and oxygen comprises zinc oxide.

* * * * *